(12) United States Patent
Nygren (10) Patent No.: US 9,381,457 B2
(45) Date of Patent: Jul. 5, 2016

(54) AIR TREATMENT DEVICE WITH A DETACHABLE SENSOR MODULE

(71) Applicant: Blueair AB, Stockholm (SE)

(72) Inventor: Joakim Nygren, Stockholm (SE)

(73) Assignee: BLUEAIR AB, Stockholm (SE)

(*) Notice: Subject to any disclaimer, the term of this patent is extended or adjusted under 35 U.S.C. 154(b) by 0 days.

(21) Appl. No.: 14/613,708

(22) Filed: Feb. 4, 2015

(65) Prior Publication Data

US 2015/0224437 A1    Aug. 13, 2015

(30) Foreign Application Priority Data

Feb. 7, 2014   (EP) .................................... 14154379

(51) Int. Cl.
| | |
|---|---|
| *B01D 46/44* | (2006.01) |
| *F24F 11/00* | (2006.01) |
| *B01D 46/00* | (2006.01) |
| *G01D 11/24* | (2006.01) |

(Continued)

(52) U.S. Cl.
CPC ............ *B01D 46/44* (2013.01); *B01D 46/0002* (2013.01); *F24F 11/0009* (2013.01); *G01D 11/245* (2013.01); *G01D 11/30* (2013.01); *F24F 2013/207* (2013.01)

(58) Field of Classification Search
CPC ... B01D 46/44; B01D 46/0002; F24F 11/001; G01D 11/245; G01D 11/30
See application file for complete search history.

(56) References Cited

U.S. PATENT DOCUMENTS 3,950,155 A * 4/1976 Komiyama ............ B01D 46/46
340/517

(Continued)

FOREIGN PATENT DOCUMENTS

| EP | 1 637 811 A1 | 3/2006 |
|---|---|---|
| JP | H04-284811 A | 10/1992 |

(Continued)

OTHER PUBLICATIONS

The partial European Search Report issued on Jul. 21, 2014, by the European Patent Office in corresponding European Patent Application No. 14154379.3-1558. (5 pages).

(Continued)

*Primary Examiner* — Amber R Orlando
*Assistant Examiner* — Britanny Precht
(74) *Attorney, Agent, or Firm* — Buchanan Ingersoll & Rooney P.C.

(57) ABSTRACT

The present specification relates to an air treatment device and a detachable sensor module. The air treatment device comprises a user interface configured to display, for selection by a user, at least one static or open-loop operational mode to be executed by a controller; and a wall comprising one or more pervious sections towards an ambient volume. One side of the wall comprises a connector for mating with a corresponding connector of the detachable sensor module, and the connector, when the sensor module is present, enables a data connection from the sensor module to the controller. When the data connection is enabled, the user interface is configured to display at least one closed-loop operational mode, in which the controller controls the air treatment section in response to measurement data relating to the ambient volume received from the sensor module.

7 Claims, 5 Drawing Sheets

(51) Int. Cl.
*G01D 11/30* (2006.01)
*F24F 13/20* (2006.01)

(56) References Cited

U.S. PATENT DOCUMENTS

| | | | | |
|---|---|---|---|---|
| 4,240,072 | A * | 12/1980 | Fowler | A47L 9/19 324/127 |
| 4,790,862 | A | 12/1988 | Naruo et al. | |
| 5,334,248 | A * | 8/1994 | Kwak | B01D 46/46 95/12 |
| 5,440,895 | A * | 8/1995 | Bahel | F24F 11/0009 62/211 |
| 5,971,913 | A * | 10/1999 | Newkirk | A61F 7/00 600/22 |
| 6,267,010 | B1 | 7/2001 | Hatanaka et al. | |
| 6,448,896 | B1 * | 9/2002 | Bankus | B01D 46/0086 236/49.3 |
| 7,789,951 | B2 * | 9/2010 | Sung | B01D 46/003 318/568.12 |
| 7,875,099 | B2 * | 1/2011 | Abraham | G06F 1/206 55/385.6 |
| 2003/0070544 | A1 * | 4/2003 | Mulvaney | B01D 46/0086 95/25 |
| 2005/0115258 | A1 * | 6/2005 | Violand | F24F 1/027 62/186 |
| 2005/0150238 | A1 * | 7/2005 | Helt | F24F 11/001 62/176.6 |
| 2007/0012192 | A1 * | 1/2007 | Pippel | B01D 46/0005 96/417 |
| 2008/0208392 | A1 * | 8/2008 | Hudson | F24F 11/001 700/276 |
| 2010/0050075 | A1 * | 2/2010 | Thorson | B60H 1/00985 715/702 |
| 2010/0280788 | A1 * | 11/2010 | Bohan | F24F 11/001 702/130 |
| 2012/0125592 | A1 * | 5/2012 | Fadell | F24F 11/0012 165/201 |

FOREIGN PATENT DOCUMENTS

JP          H10-249129 A       9/1998
KR    10-2012-0063881 A       6/2012

OTHER PUBLICATIONS

The extended European Search Report issued on Sep. 19, 2014, by the European Patent Office in corresponding European Patent Application No. 14154379.3-1558. (11 pages).

* cited by examiner

AIR TREATMENT DEVICE WITH A DETACHABLE SENSOR MODULE

CROSS REFERENCE TO RELATED APPLICATIONS

The present application claims the benefit of European Application No. 14154379.3, filed on Feb. 7, 2014. The entire contents of European Application No. 14154379.3 are hereby incorporated herein by reference in their entirety.

TECHNICAL FIELD

The present specification generally relates to the field of air treatment devices and in particularly discloses sensor modules for supplying measurement data to air treatment devices.

TECHNICAL BACKGROUND

Air treatment devices are used for treatment of indoor air, for example cleaning of indoor air. A conventional air treatment device normally comprises an air treatment section adapted to remove pollutants from an air stream guided through the device.

The air treatment section may e.g. comprise one or more filters for filtering the air stream from particles. Typically, the air treatment section in such devices further comprises a fan for generating the air stream to be treated by the air treatment section and may have one or more operational modes which may be manually selected by a user in order to adapt the operation of the device, for example the fan speed, as the user finds suitable. This type of device is especially useful for applications where the initial quality of air, and thereby the required intensity of operation of the air treatment device, is easily predictable. Other advantages include simplicity and robustness of the design.

It is also known from more complicated and expensive air treatment devices to provide automatic operational modes wherein measurement data from sensors, detecting for example particle levels in the flow of air, are used to automatically control the operation of the air treatment device. For example, should high particle levels be detected the device may automatically increase fan speed or change the filtration method. This type of device may be useful for example in spaces where air quality varies to a large extent.

However, air treatment devices may be used in many different areas of for example a building during their lifetime; accordingly, the technical needs may be difficult to predict for a user when purchasing a device. Likewise, overall economy may be difficult to estimate since a device of the first type may be cheaper, whereas the latter more advanced device provides a more flexible but also more expensive alternative.

SUMMARY

Accordingly, it would be desirable to provide an air treatment device having a higher degree of flexibility as compared to the above described prior art. In particular, it would be advantageous to enable more flexible options for the modes of operation over the course of the lifetime of the device. To better address one or more of these concerns, an air treatment device and a method of operating an air treatment device having the features defined in the independent claims are provided. Preferred embodiments are defined in the dependent claims.

According to one aspect, a detachable sensor module is provided. The detachable sensor module comprises mating means for mating with an air treatment device; the mating means comprises a connector for establishing a data connection to the air treatment device; the connector is adapted to mate with a corresponding connector located on a first side of a wall of the air treatment device; the detachable sensor module comprises: a recess comprising at least one opening facing the side of the wall; a first sensor arranged in the recess and adapted to detect particulate matter and a second sensor arranged in the recess and adapted to detect gaseous matter. Further, the detachable sensor module comprises circuitry adapted to transmit measurement data generated by said first and second sensors via the data connection upon mating with the air treatment device.

A sensor module in accordance with the present aspect is adapted for mating with the device in a simple way and thereby supplies the air treatment device with measurement data relating to particulate matter present in an air volume, such as a level or number of particles or what may be referred to as a particle concentration as well as to gaseous matter present in the volume, which may for example be referred to as a gas concentration. The air treatment device may then utilize this information for example as input for an automatic, or closed-loop, operational mode. This increases the flexibility of the air treatment device and provides possibilities for a modular design by which different sensor modules and different air treatment devices can be combined according to a specific need.

The mating with the air treatment device may be performed by inserting the sensor module into the air treatment device. In such an exemplary case, the first side of wall of the air treatment device on which the connector is arranged may be the inner side. Consequently, the compartment formed by the recess and delimited by the wall will in this case be arranged inside the device and may be described as constituting part of an inner volume of the air treatment device. This is advantageous in that the sensor module in this case is not visible from the outside of the air treatment device, which reduces the risk of for example unauthorized removal of the module as well as the risk of damage to the sensor module. The connector may be arranged in the recess, which provides advantages in that the connector is protected inside the recess as well as in that the design may be made more compact. In other embodiment the connector may be arranged outside of the recess.

The recess is advantageous for example in that it provides a well suited space for the sensors as well as in that the inside of the recess is easy accessible when the sensor module is not arranged in the device which may facilitate any necessary maintenance or repairs.

According to an embodiment, the sensor module may comprise at least one supporting element for reducing the mechanical load on the connector. Optionally, the supporting element(s) may be arranged for mating with the air treatment device by insertion of the sensor module in a direction substantially parallel to a direction of insertion of the connector. In a simple embodiment, the supporting means merely comprise at least one of the sides of for example a box shaped module. The supporting element(s) may in other embodiment comprise a slot, groove, notch or the like. In other embodiments, the supporting means may be a protruding edge or rail, or any other suitable projection. Apart from reducing the mechanical load on the connector, the supporting means are also advantageous in that they may serve as guides for a user attempting to insert the module into the air treatment device.

According to another embodiment, the sensor module may comprise mating means arranged to urge the sensor module onto the wall. This may be achieved for example by designing the mating means such that a clamping force is achieved, for example through a slight interference fit with a corresponding structure of the air treatment device. Other embodiments may comprise for example releasable screws urging the module onto the wall. Urging the module onto the wall is advantageous in that a substantially air tight seal may be created between the recess and the first side of the wall, thereby ensuring a satisfactory sensor performance. Further, in this way, the air volume used for the measurement data is clearly delimited from the first air flow through the air treatment device, and any mix between the air flow used for measurements with already treated air from the air treatment device may be prevented. It may also be possible to create a stable convection current through the compartment by thermal means. Some embodiments may comprise additional sealing means in order to enhance this effect; examples include rubber seals, gaskets, sealing strips or the like.

According to one embodiment of the present aspect of the invention, the recess is arranged to form a compartment delimited on one side the side of the wall of the air treatment device. The compartment formed is advantageous for example in that the components arranged in the recess are further protected. Since the compartment is delimited by the wall of the air treatment device, a simple design wherein the number of parts is reduced may be achieved.

According to another embodiment, the sensor module further comprises a cover comprising at least one pervious section, and the recess is arranged to form a compartment delimited on one side by the cover. This is advantageous in that the compartment in this case is protected by the cover, also when the sensor module is not mated with, the air treatment device. The at least one pervious section allows for a flow of air to the first and second sensor through the cover and may be located in proximity of, or at least in fluid connection with, at least one sensor when the cover is arranged to cover the recess. Examples include perforated areas or through holes. The cover may be designed as a separate removable cover piece which may be attached to the sensor module using for example a screw, snaps, hooks or any other suitable attachment means making removal of the cover convenient for the user. Other embodiment may include a cover attached to the sensor module via hinges or similar structures. Further holes may be arranged in the cover in order to facilitate for example cleaning of a sensor or the like. A sealing joint, or strip, may be arranged around in order to ensure a substantially air tight seal between the cover and the wall.

In another embodiment of the sensor module, the recess may comprise a first sub-compartment and a second sub-compartment, and the first sensor may be arranged in the first sub-compartment, and the second sensor may be arranged in the second sub-compartment. The sub-compartments may be adjacent and created for example by arranging a dividing wall in the recess; in other embodiments, the sub-compartments may be arranged separate from one another and comprise one or more walls each. Arranging the sensors in different sub-compartments is advantageous in that particle sensors and gas sensors are typically adapted to use different types of air flows, wherein a particle sensor typically is adapted to collect data from a stream of air and a gas sensor is typically adapted to collect data from a substantially stationary volume of air. In order to facilitate the flow of air suitable for the particle sensor, in some embodiments, there may be arranged means in the first compartment, such as a channel and a heater designed for this purpose, in order to create a flow of air from a first inlet to a first outlet.

In one embodiment, the detachable sensor module is configured to transmit the measurement data in real time. By real time should be understood that the data are transmitted at the time of actual measurement and not stored in the sensor module before being transmitted. This simplifies the design of the circuitry of the sensor module, e.g. no memory is needed, as well as ensures that the data transmitted to the air treatment device are current and updated.

In one embodiment, the data connection is a Universal Serial Bus (USB) connection. A USB connector provides advantages for example in that is easily mated with a corresponding connector even when the sensor module is arranged in a less visible position in the air treatment device. The design of the USB connector may also facilitate load carrying by the connector. In one embodiment, the connector may comprise a cable allowing a greater freedom for the placement of the sensor module. Other exemplary types of data connections include but are not limited to a pin strip connection and an Ethernet type connection, for example a so called RJ45 connection.

According to one embodiment, the sensor module comprises a resilient structure located to create, in the mated position of the sensor module, a substantially air tight seal between the sensor module and the side of the wall. Examples include rubber seals, gaskets sealing strips or the like. Such a sealing structure is advantageous in that it effectively delimits and thereby defines the air flow to which the measurement data from the first and second sensor relate such that well controlled, accurate measurements may be ensured. Further, a substantially air-tight seal may also increase sensor performance.

According to a second aspect, an air treatment device is provided. The air treatment device comprises an air treatment section operable to treat a first flow of air drawn from an ambient volume, a controller configured to control the air treatment section, a user interface configured to display, for selection by a user, at least one static or open-loop operational mode to be executed by the controller and a wall facing the ambient volume on a first side and comprising one or more pervious sections. The second side of the wall, which is opposite to said first side, comprises a connector for mating with a corresponding connector of a detachable sensor module, and the connector, when the sensor module is present, enables a data connection from the sensor module to the controller. The user interface, when the data connection is enabled, is configured to display at least one closed-loop operational mode, in which the controller controls the air treatment section in response to measurement data relating to the ambient volume received from the sensor module.

An air treatment in accordance with the second aspect is able to either, when a sensor module is not present, function as the less complex type of device described in the background section wherein a user chooses an operation mode, which may for example be a set fan speed, and the device carries out the mode of operation until new instructions are received, or, in the case where a more complex mode of operation of the device is required, to receive a detachable sensor module mating with the device in order to form a device of the more complex type wherein the mode of operation is automatically controlled based on measurement data provided by the sensor module. Conversely, of course, should the automatic mode of operation not be required, the sensor module may be removed, possibly for use in another device. Thus, the flexibility of the air treatment device is greatly increased.

The air treatment device may be designed such that the mating with the detachable sensor module may be performed by insertion of the sensor module into the air treatment device. In such an exemplary case, the second side of wall of the air treatment device on which the connector is arranged may also be described as an inner side, facing an inner space, or compartment, of the air treatment device. This is advantageous in that the connector, and accordingly the detachable sensor module, is not visible from the outside of the air treatment device, which reduces the risk of for example unauthorized removal of the module as well as the risk of damage to the sensor module. In such an exemplary embodiment, the air treatment section may be arranged in the inner compartment, or space, of the air treatment device as another option. In the case of both the detachable sensor module and the air treatment device being arranged inside an inner compartment of the air treatment device, the pervious section is especially advantageous in that it allows for a flow of air from the ambient volume on the second side of the wall to be directed to the detachable sensor module to ensure that the measurement data from the sensor module is in fact related to the ambient volume and not to the flow of air treated by the air treatment section.

The static operational mode provides a specific setting for the air treatment section, for example fan speed, filtering mode and/or ionization current, which remains constant until another operational mode is chosen. The open-loop operational mode may be based on simple parameters such as time of day or the like. In the at least one closed-loop operational mode, on the other hand, the controller controls the air treatment section in response to the measurement data. That is, a set air quality in terms of for example particle- and/or gas levels may be achieved.

The pervious section of the wall may comprise any type of structure permitting an air flow there through such as for example a net, a perforated structure, a grid, grill or lattice. The pervious section may also comprise one or more open through hole(s).

The air treatment section may comprise a fan unit and at least one filter or filter unit such as a HEPA filter or any other mechanical filter. Other exemplary means for treatment of air that may be comprised in the air treatment section include electrical means for air treatment using electrostatic effects to attract particles, gas-phase filters, or devices using ultraviolet radiation and/or ionization. Some embodiments may include means for humidification of air. Accordingly, the controller may be configured to control parameters such as filter selection, fan speed, ionization current or any other parameter suitable for the air treatment section in question.

The user interface may be a graphical user interface, for example a display device such as a liquid crystal (LCD) display, or in more simple embodiments may comprise for example LEDs guiding the user. The selection of mode of operation by the user may be performed using conventional means such as a button, knob or touch button maneuvered by the user. Other embodiments may comprise the user interacting with touch- or pressure-sensitive areas of the interface, or screen, to perform the selection. Yet other embodiments may comprise a non-touch sensing means for selection of mode of operation, such that the user may for example perform a gesture in order to select an operational mode. Such sensing means may comprise for example infrared (IR) technology.

The selective displaying of the closed-loop operational mode is advantageous in that availability of the new operational mode is clearly indicated to the user. Further, the presence of the detachable sensor module is in this way clearly indicated also when the sensor module is arranged in a less visible position in the device and thereby provides feedback to the user mating the sensor module to the device that the mating has been successful. On the other hand, equally advantageously, the operational mode is not visible to the user when the detachable sensor module is not present. That is, only operational states which may be executed by the controller at the time of selection will be shown for selection by the user.

In one embodiment of the present aspect, the user interface, when the data connection is enabled, is further configured to display at least one indication of the measurement data relating to the ambient volume. This is advantageous since the user may get a clear visual indication of the quality of the ambient volume, derived from the measurement data. This information may be displayed when the data connection is enabled regardless of the operational mode selected by the user. In other words, the displaying of the level of measurement data provides the user with an indication of the quality of the air of the ambient volume, which the user may for example utilize in order to choose one of the at least one static or open-loop operational modes of the air treatment device. In the case that the closed-loop operational modes is selected, the levels of measurement data or indication of quality of the ambient air volume is displayed to the user who may for example be alerted to any changes to the air quality and/or the performance of the air treatment device. The indication of the measurement data, which may also be referred to as quality levels, may be displayed to the user using for example areas of different colors, differently shaped patterns or the like in the user interface.

In one embodiment of the present aspect, the connector is positioned in the air treatment device to allow the sensor module to cover an area of the wall coinciding at least partially with the pervious section. This is advantageous in that the recess of the sensor module may be arranged to receive a second air flow of ambient air via the previous section, different from the flow of air treated by the air treatment section. In this way, it may be ensured that the measurement data received from the sensor are in fact an indication of the actual conditions in the ambient volume, and not mistakenly relating to a flow of air already treated by the air treating section. Alternative embodiments may however comprise a connector positioned such that the sensor module covers a nonpervious section of the wall. For example, ambient air may in this case be led to the sensor module using a fluid channel or pipe. In another exemplary embodiment, the connector may be positioned such that the first flow of air drawn from the ambient volume passes the sensor module before being treated by the air treatment section.

In one embodiment of the air treatment device, the air treatment device further comprises attachment means for retaining and urging the sensor module onto the wall. Attachment means may comprise guides such as bars, rails, grooves or the like, and may either be separate units or formed integrally with the wall. The guides may for example be arranged to guide the sensor module in a direction substantially parallel to a direction of insertion of the sensor module. Other types of attachment means may comprise snaps, catches, hatches or hooks. The urging effect may be achieved for example by designing the attachment means such that a clamping force is achieved with a corresponding structure of the sensor module, for example though a slight press fit. This is advantageous in that it delimits the ambient air, flow to which the measurement data from the first and second sensor relate, from the first air flow which is provided to the air treatment section. Not providing a seal may result in misleading measurement data influenced for example by air already treated by the device, which will result in misleading low levels of particulate and gaseous matter, or low particle and gas concentrations, and may hence impair performance of the air treatment device operating in the closed-loop operational mode. Further, a substantially air-tight seal may increase sensor performance.

In one embodiment of the air treatment device, the sensor module is retained by a hollow frame structure into which the sensor module is inserted at mating. The hollow frame structure may provide mechanical support in at least two directions; some embodiments may comprise a stop limiting motion in a third direction. The frame structure is advantageous not only in that it provides mechanical support in at least two directions; the frame structure, or cage, may also facilitate mating of the module by providing mechanical and/or tactile guidance as well as a visual indication of the correct placement of the sensor module. The frames structure, or cage, also provides additional protection to the sensor module when positioned in the air treatment device as well as to the connector of the air treatment device when no sensor module is mated.

In one embodiment, the air treatment device further comprises a resilient structure for creating a substantially airtight seal between the sensor module and the wall. Examples include rubber seals, gaskets sealing strips or the like. Such a sealing structure is advantageous in that it even more effectively delimits the ambient air flow to which the measurement data from the first and second sensor relate from the first air flow which is provide to the air treatment section as described above. Further, as mentioned above, a substantially air-tight seal may also increase sensor performance.

In one embodiment of the air treatment device, the pervious section comprises three through holes arranged in the wall, at least two of which are located on different vertical levels. This is advantageous in that two of the through holes may be arranged to admit a convective flow into the recess of the sensor module and one through hole may be arranged to admit a flow out the recess of the sensor module; this is because the first sensor may require a flow of air for detecting a particulate matter, or particle concentration whereas the second sensor may require a stationary volume for detecting gaseous matter, or gas levels. That is, two of the through holes may be arranged in fluid communication with the first sensor and one through hole may be arranged in fluid communication with the second sensor. The through holes may comprise any suitable shape such as round, square-shaped, elongated and so forth.

In one embodiment of the second aspect, the second side of the wall at least partially delimits a through channel for admitting the first flow of air. The through channel may be defined completely by the wall, or may be defined by one or more additional walls or the like depending on the shape of the channel.

In one embodiment of the air treatment device, the instructions for performing the at least one closed-loop operational mode are pre-stored by the controller. This is advantageous in that the instruction may be provided by the manufacturer upon delivery and hence adapted to the specification of the air treatment device, and damage to the air treatment device due to erroneous operation may be avoided. Further, the instructions may be drawn up such that the use of sensor modules not authorized by the manufacturer in the air treatment device may be prevented.

According to one embodiment of the air treatment device, the data connection is a USB connection. The USB provides advantages for example in that a USB connector is easily mated with a corresponding connector even when the sensor module is arranged on a less visible position in the air treatment device. The design of the connector may also facilitate load carrying by the connector. Other exemplary types of data connections include but are not limited to a pin strip connection and an Ethernet connection, for example a so called RJ45 connection.

According to a third aspect a method for operating an air treatment device is provided. The method comprising the steps of displaying, for selection by a user, at least one static or open-loop operational mode to be executed by a controller; controlling an air treatment section of the air treatment device in response to a user selection; detecting the presence of a detachable sensor module; and, in response to detecting presence, establishing a data connection from the detachable sensor module to the controller and displaying for selection by a user at least one closed-loop operational mode, in which the controller controls the air treatment section in response to data received from the sensor module.

By a method according to the third aspect, an air treatment device may either function as a less complex type of device, wherein a user simply selects a static or open loop operational mode, or, in the case when a detachable sensor module, the air treatment device may be mated with a sensor module to operate as a device of the more complex type, wherein the mode of operation is automatically controlled based on the measurement data provided by the sensor module.

The displaying, for selection by a user, of at least one static or open-loop operational mode to be executed by a controller may be performed for example by using different combinations knobs or buttons, or may be performed electronically using for example LEDs or other light sources in different combinations or by displaying information on for example an LCD-screen or similar. Other examples include a non-touch sensing means for selection of mode of operation, such that the user may for example perform a gesture in order to select an operational mode. Such sensing means may comprise for example infrared (IR) technology. Controlling the air treatment section of the air treatment device in response to a user selection may in some embodiments refer to controlling for example a fan speed, a filter selection, selection of ionization current and/or a humidification level for the air treatment section.

In the step of displaying for selection by the user at least one closed-loop operational mode, in which the controller controls the air treatment section in response to data received from the sensor module, the at least one closed-loop operational mode may be displayed as an only option, or mode, available for the user to select, or it may be displayed along with the static- or open-loop operational modes displayed top the user before the detachable sensor module was detected.

In one embodiment, the method may further comprise the step of displaying, when the data connection is established, at least one indication of the measurement data relating to the ambient volume. This is advantageous since the user may for example get a clear visual indication of the quality of the ambient volume, derived from the measurement data. This information may be displayed when the data connection is enabled regardless of the operational mode selected by the user. In other words, the displaying of the level of measurement data provides the user with an indication of the quality of the air of the ambient volume, which the user may for example utilize in order to choose one of the at least one static or open-loop operational modes of the air treatment device. In the case that the closed-loop operational modes is selected, the levels of measurement data or indication of quality of the ambient air volume is displayed to the user who may for example be alerted to any changes to the air quality and/or the performance of the air treatment device. The indication of the measurement data, which may also be referred to as quality levels, may be displayed to the user using for example areas of different colors, differently shaped patterns or the like in the user interface.

Further objectives of, features of and advantages with the present invention will become apparent when studying the following detailed disclosure, the drawings and the appended claims. Those skilled in the art realize that different features of the present invention can be combined to create embodiments other than those described in the following.

BRIEF DESCRIPTION OF THE DRAWINGS

The invention will be better understood through the following illustrative and nonlimiting detailed description of preferred embodiments, with reference to the appended drawings, on which.

All figures are schematic, not necessarily to scale, and generally only show parts which are necessary in order to elucidate the invention, wherein other parts may be omitted or merely suggested.

DETAILED DESCRIPTION OF EMBODIMENTS

Figure 1A:
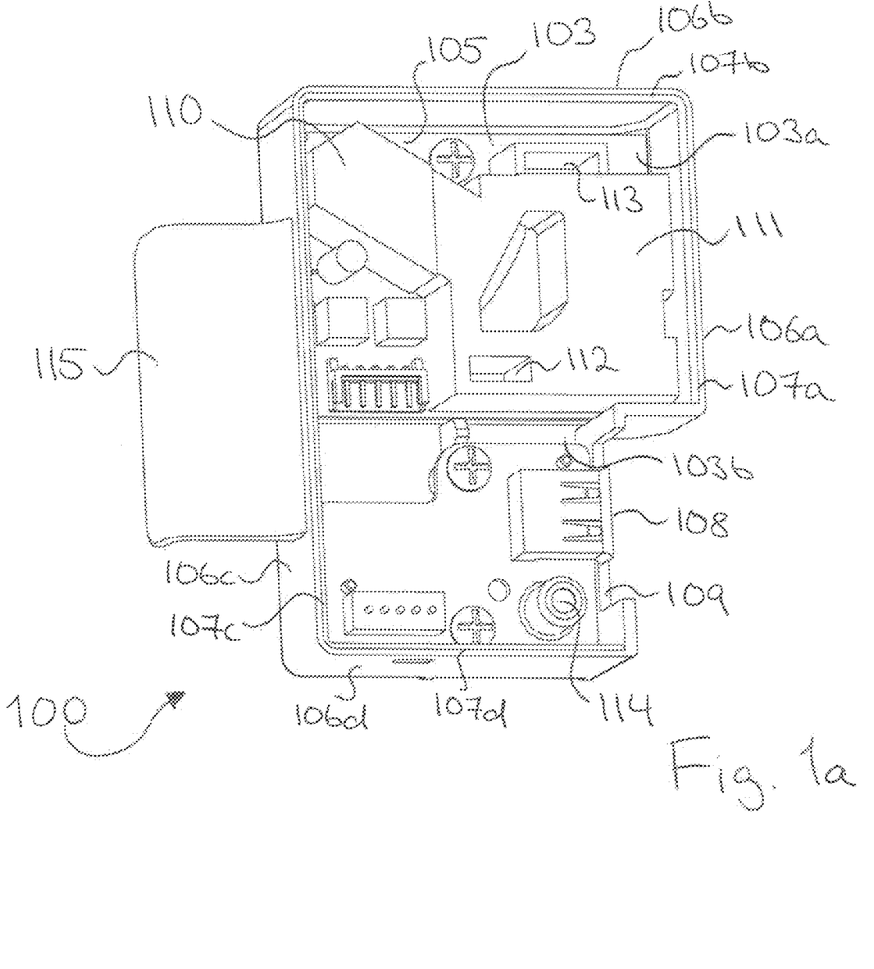
FIG. 1a is a perspective view of a detachable sensor module according to an embodiment.

A detachable sensor module 100 according to an embodiment is shown in FIG. 1a. A casing 101 defines a recess 103 arranged to form a compartment delimited on one side by the wall of the air treatment device when mated with the air treatment device. The casing comprises a bottom surface 105 and four sides 106 a-d. The sides 106 a-d comprise upper edges 107 a-d, which form an interface against the wall of the air treatment device.

The module 100 further comprises a connector 108 for establishing a data connection to an air treatment device (not shown) by mating with a corresponding connector. In the illustrated case, the connector 108 is a USB connection. One side 106 d of the casing comprises a cut-out section 109, allowing the connector 108 to mate with a corresponding connector of the air treatment device.

A first sensor 110 is arranged in a first sub-compartment 103a of the recess 103 and adapted to detect particulate matter. The sensor may be of a conventional type of particle sensor, known in the art per se, and will not be described in further detail. A channel arrangement 111, comprising an inlet 112 and an outlet 113 is adapted to create a flow of air for the sensor 110. The channel arrangement 111 further comprises a heater element which by heating the air creates a flow by forced convection. A second sensor 114 is arranged in a second sub-compartment 103b of the recess, adapted to detect gaseous matter. The sensor is of a conventional gas sensor type, known in the art, and will not be described further. Circuitry (not shown) is arranged to transmit the measurement data generated by the sensors via the data connection.

A protruding handle structure 115 is arranged on the outer side of the casing 101. The handle structure 115 will facilitate insertion and removal of the sensor module for a user when mating the module with the air treatment device.

Figure 1B:
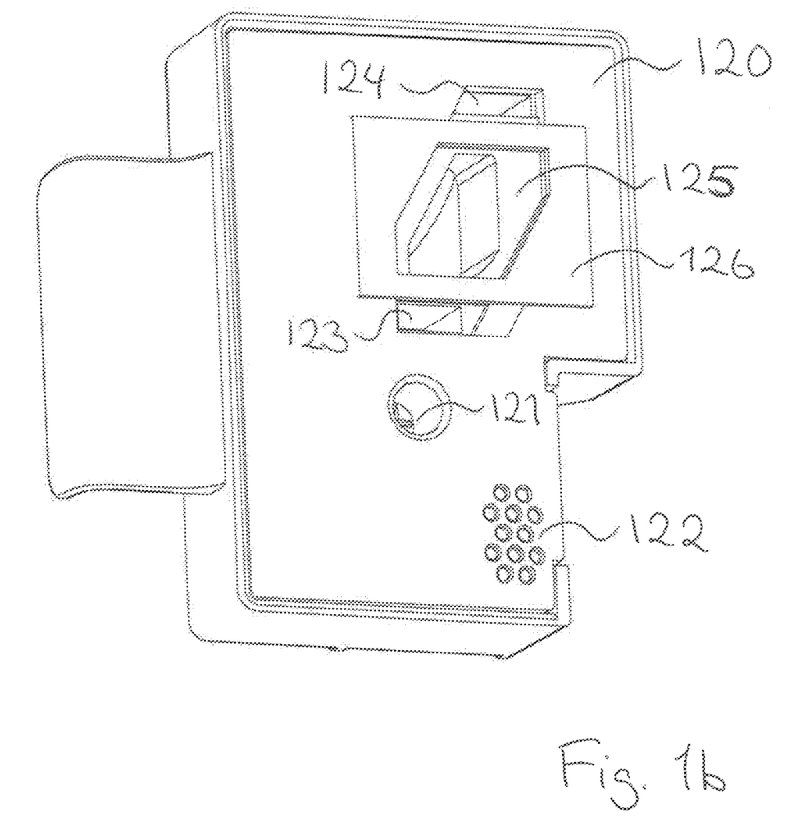
FIG. 1b is a perspective view of a detachable sensor module comprising a cover according to one embodiment.

FIG. 1b shows an embodiment wherein the sensor module is a compartment delimited on one side by a cover 120 covering the recess 103. The cover is substantially equal in size and shape to the area delimited by the upper edges 107 a-d. In the illustrated embodiment, the cover 120 is attached to the casing structure using a conventional screw 121, which makes removal of the cover convenient for maintenance purposes. The cover comprises a pervious area 122 which is located in this case directly above the second sensor 114, in this case a gas sensor, when the cover 120 is mounted and covers the recess 103. The cover 120 further comprises a first hole 123 and a second hole 124 arranged in this case directly above the inlet 112 and outlet 113 of the channel arrangement 111 in order to allow for a flow of air through the channel also when the cover is present. A third hole 125 is arranged in order to facilitate cleaning of the particle sensor, by using the third hole 125 the user does not need to remove the cover when performing such cleaning, or maintenance. A sealing joint, or strip, 126 is arranged around the third hole 125 in order to ensure a substantially air tight seal between the cover and the wall.

Figure 2:
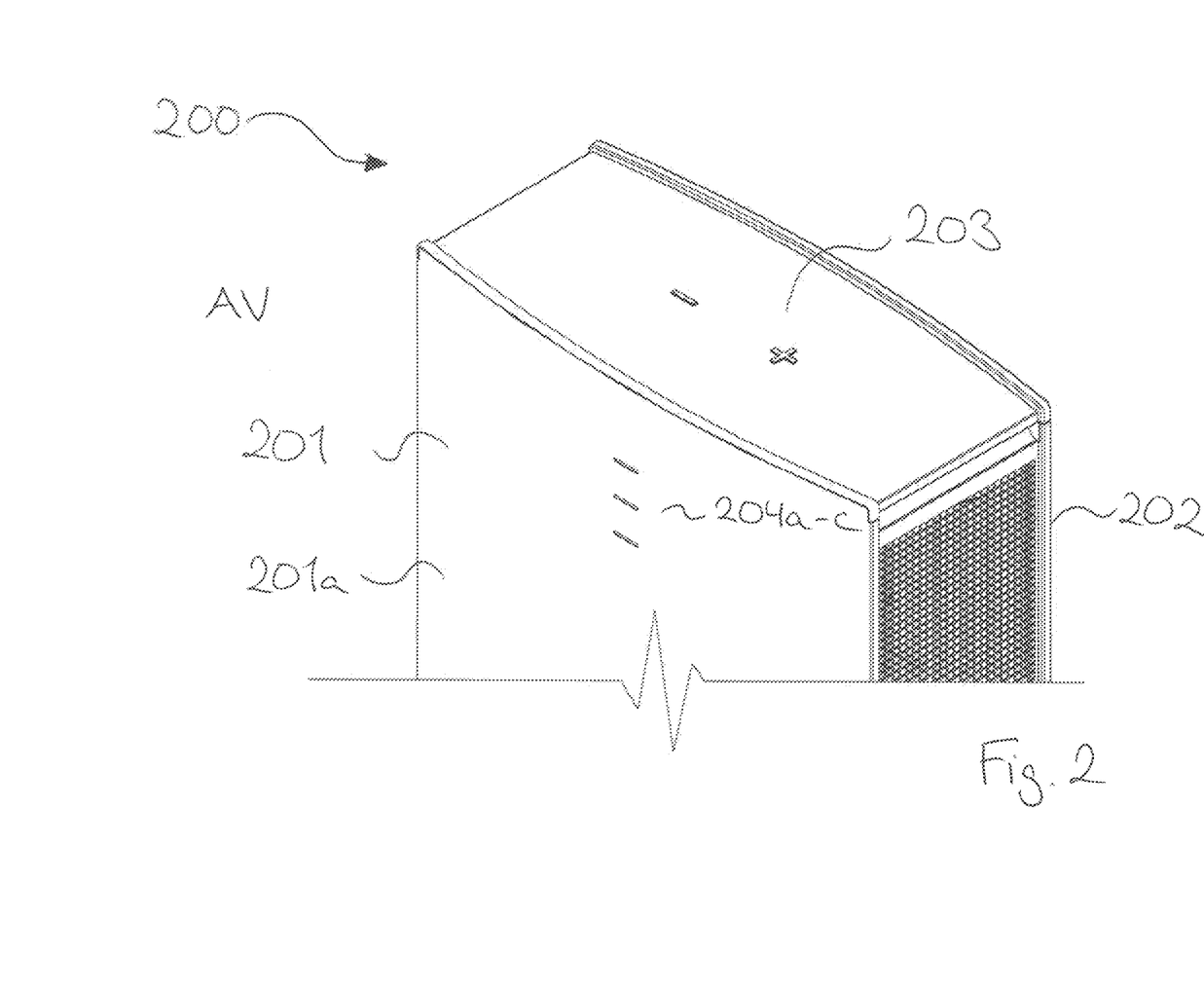
FIG. 2 shows an upper section of an air treatment device according to an embodiment.

FIG. 2 shows an embodiment of an air treatment device 200. The device 200 comprises a through channel delimited by walls 201, 202 which admit a first flow of air from an ambient volume AV, wherein the exterior side 201a of the wall 201 faces the ambient volume The device further comprises an air treatment section, comprising for example an ionization unit (illustrated in FIG. 3a) and/or a fan and a filter unit (not shown), for treatment of the first flow of air. The device 200 further comprises a controller (not shown) and a user interface 203. The user interface 203 is illustrated on the upper side of the device 200 but may be arranged on any side of the device. In the illustrated case, the user interface 203 comprises an electronic screen and pressure sensitive areas allowing the user to select the operational mode of the device. The wall 201 further comprises a pervious section 204, in the illustrated case comprising three through holes 204a-c.

Figure 3A:
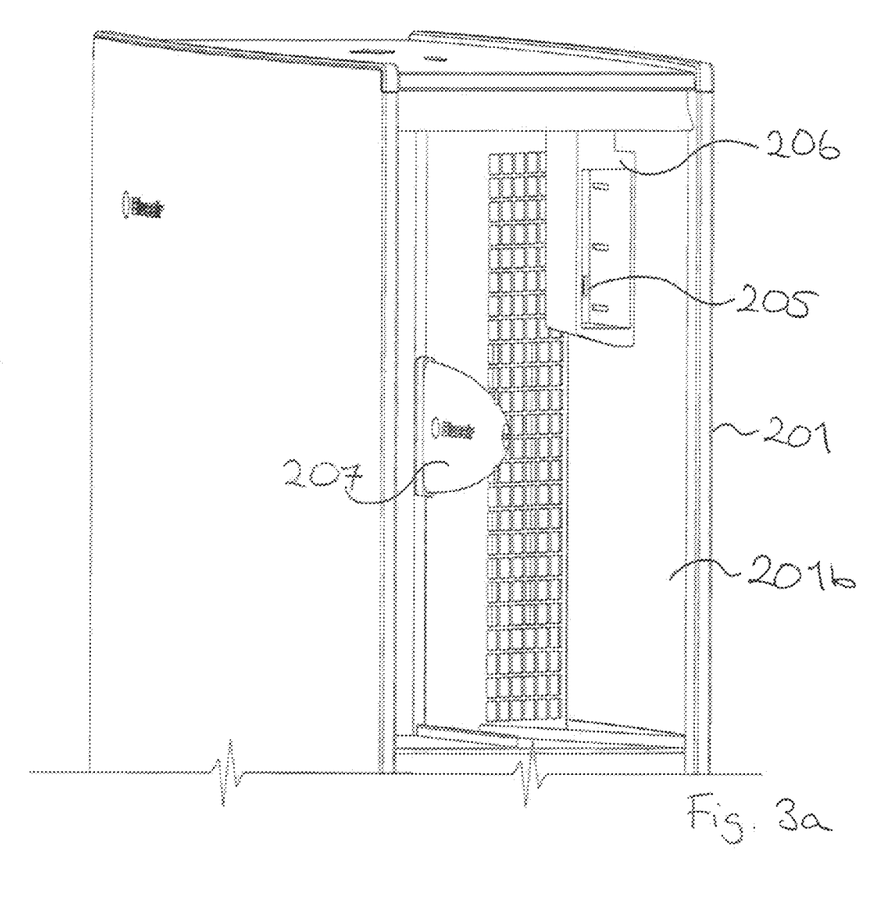
FIG. 3a is a perspective view of the inside of the embodiment shown in FIG. 2.

FIG. 3a shows the interior of the air treatment device with a side 201b of the wall 201 facing the interior, and in particular shows a connector 205 and attachments means in the form of a hollow frame structure 206 into which the sensor module 100 is inserted at mating. The connector 205 is arranged on the side 201 b (in this case: the inner or interior side) of the wall for mating with a corresponding connector of the detachable sensor module 100. In the illustrated case, the connector 205 is a USB connector. The design of the frame structure is such that frame sections extend below the sensor module, above the sensor module as well as outside of the module, in relation to the wall. Thereby, the frame structure 206 will carry the weight of the sensor module 100 utilizing mainly the sections below the sensor module and also urge the sensor module 100 onto the wall 201, mainly utilizing the section arranged outside the sensor module 100. Thereby the mechanical load on the connectors 108, 205 is reduced.

In addition, the frame structure 206 will serve as a guide for a user inserting the sensor module. A relatively tight fit, or tolerance, between the sensor module and the frame structure is provided to ensure that the corresponding connectors of the module and the device respectively will mate properly. This will reduce the risk of possible harm to the connectors.

FIG. 3a further shows the ionization unit (207) which is an example of means for treatment of the first flow of air which may be comprised by the air treatment section.

The air treatment device 200 is controlled by a controller (not shown). When no sensor module is connected to the device, the user interface 203 displays at least one static or open-loop operational mode to be executed by the controller for the user to select using the interface 203. In the exemplary embodiment the selected mode of operation is visually indicated to the user on the interface 203, in this case by displaying different numbers of colored bars, or rectangular shapes, wherein a lower number of bars indicates a lower level of activity, for example a lower fan speed, and vice versa (not shown). The user interface is configured to display, in response to mating with the sensor model 100, an additional operational mode to the user. This operational mode is a closed-loop operational mode in which the measurement data from the first and second sensor 110, 114 are used to automatically control the air treatment section in response to the detected air quality, in terms of particle levels and gas levels. Should the user select the closed-loop operational mode, a visual indication of this selection may be shown to the user via the interface 203 (not shown). This operational mode is in the described embodiment stored by the controller, that is, the sensor module passively provides measurement data which are utilized by the controller in the stored operational mode.

Further, in the illustrated embodiment, the user interface 203 is configured to display, when the data connection to the sensor module 100 is enabled, a visual indication of the quality of the air derived from the measurement data, in this case a visual indication of gas and particle levels. This visual indication is present regardless of which operational mode, static-open-loop or closed-loop, is selected by the user. In the illustrated case, the visual indication comprises bars of different length and different color, indicating the quality of the ambient air using a first and a second "green-yellow-red scale" visually indicating the gas- and particle levels respectively (not shown).

Figure 3B:
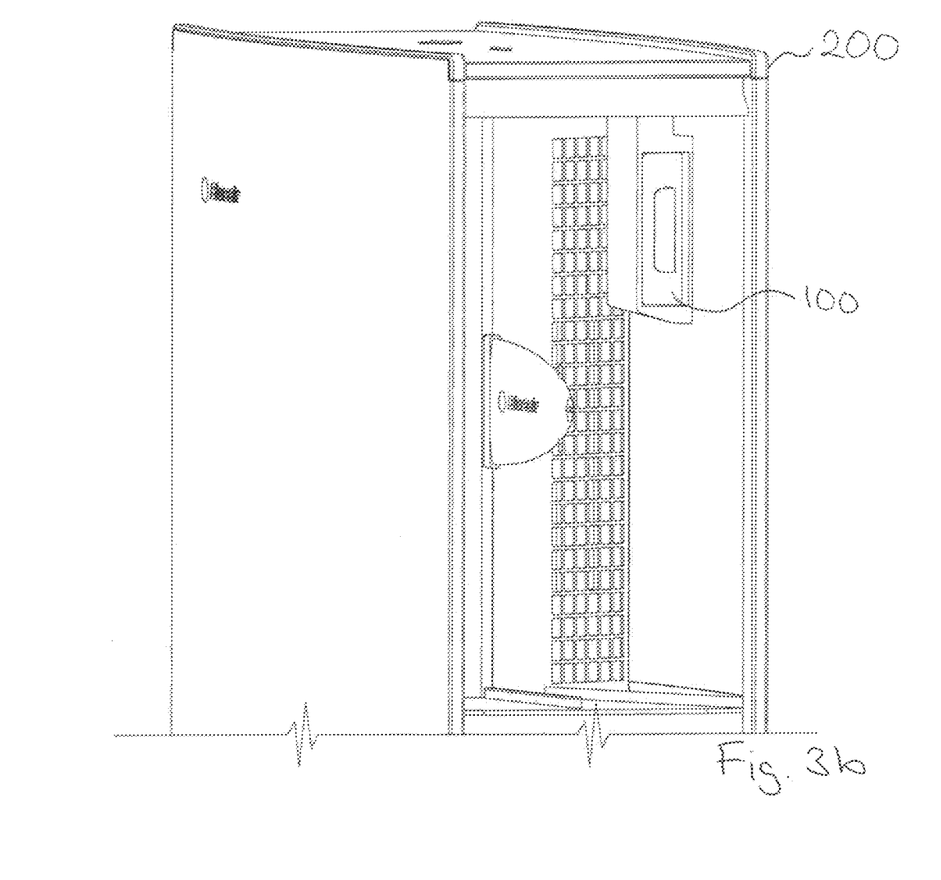
FIG. 3b is a perspective view of the inside of the embodiment show in FIG. 3a with an embodiment of the detachable sensor module inserted.

FIG. 3b shows the air treatment device 200 and the detachable sensor module 100 mated to one another. The recess 103 of the sensor module 100 and the wall 201 of the air treatment device are arranged to form a compartment 104 when the sensor module 100 and the air treatment device 200 are mated. In the embodiment shown in FIGS. 3a and 3b, the frame structure 206 is arranged such that the sensor module 100 when mated will cover the area of the wall wherein the three through holes 204 a-c are arranged. Thereby, the compartment formed by the recess and the wall in which the sensors 110, 114 is in fluid communication with the ambient volume AV via the three through holes 204 a-c. In the illustrated embodiment, in the mated state, the two upper through holes 204 a-b are in fluid communication with the first sub-compartment and accordingly in communication with inlet 112 and outlet 113 of the first compartment thereby providing ambient air for a flow of air for the first sensor created by forced convection induced by the heating element, wherein the sensor 110 may detect particle levels. The third through hole 204c is arranged in communication with the second sub-compartment 103b and accordingly the second sensor 114 detecting gas levels.

With this arrangement, an effect is achieved wherein the sensors 110, 114 arranged in the compartment 104 detect particle levels and gas levels of a flow of air directly from the ambient volume AV, different from the flow of air which is treated by the air treatment device 200. In this way, it is ensured that the particle and gas levels detected by the sensors 110, 114 indicate the correct parameters relating to the quality of the ambient air, since any mixing with for example a flow of already treated air is avoided. Such a mixing of flows would otherwise result in misleading values indicating a lower level of particles and gas, which would in turn cause the close-loop operation mode to decrease the level of treatment of the air in the false conception that the ambient clean is as clean as the treated air.

While specific embodiments have been described, the skilled person will understand that various modifications and alterations are conceivable within the scope as defined in the appended claims.

The invention claimed is:

1. An air treatment device, comprising:
an air treatment section operable to treat a first flow of air drawn from an ambient volume;
a controller configured to control the air treatment section;
a user interface configured to display, for selection by a user, at least one static or open-loop operational mode to be executed by the controller; and
a wall facing the ambient volume on a first side and comprising one or more pervious sections,
wherein a second side of the wall, which is opposite to said first side, comprises a connector for mating with a corresponding connector of a detachable sensor module;
wherein the connector, when the sensor module is present, enables a data connection from the sensor module to the controller;
wherein the user interface, when the data connection is enabled, is configured to display at least one closed-loop operational mode, in which the controller controls the air treatment section in response to measurement data relating to the ambient volume received from the sensor module; and
wherein the controller is configured to control the air treatment section with the at least one static or open-loop operational mode when the connector of the detachable sensor module is not connected to the connector of the second side of the wall.

2. The air treatment device according claim 1, wherein the user interface, when the data connection is enabled, is further configured to display at least one indication of said measurement data relating to the ambient volume.

3. The air treatment device according to claim 1, wherein the connector is positioned to allow the sensor module to cover an area of the wall coinciding at least partially with the pervious section(s).

4. The air treatment device according to claim 1, further comprising attachment means for retaining and urging the sensor module onto the wall.

5. The air treatment device according to claim 1, wherein the pervious section comprises three through holes arranged on the wall, at least two of which are located on different vertical levels.

6. The air treatment device according to claim 1, wherein instructions for performing the at least one closed-loop operational mode are pre-stored by the controller.

7. The air treatment device according to claim 1, wherein the user interface is configured to display the closed loop operational mode only when the sensor module is present and the data connection from the sensor module to the controller is enabled.

* * * * *